(12) United States Patent
Bandai et al.

(10) Patent No.: US 7,823,669 B2
(45) Date of Patent: Nov. 2, 2010

(54) HYBRID VEHICLE

(75) Inventors: Hiroyuki Bandai, Toyota (JP);
Tomonari Taguchi, Toyota (JP); Hideto Minekawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 127 days.

(21) Appl. No.: 12/224,177

(22) PCT Filed: Nov. 14, 2006

(86) PCT No.: PCT/JP2006/323069
§ 371 (c)(1),
(2), (4) Date: Aug. 20, 2008

(87) PCT Pub. No.: WO2007/108166
PCT Pub. Date: Sep. 27, 2007

(65) Prior Publication Data
US 2009/0195093 A1 Aug. 6, 2009

(30) Foreign Application Priority Data
Mar. 16, 2006 (JP) .............................. 2006-072834

(51) Int. Cl.
*F01P 3/20* (2006.01)
(52) U.S. Cl. ...................... 180/65.27; 165/103; 165/42; 180/65.275; 123/41.29; 123/41.12; 123/41.09; 123/41.42; 123/41.31
(58) Field of Classification Search ................ 180/65.1, 180/65.21–65.29; 165/41–44, 103; 123/41.29, 123/41.31, 41.12, 41.09, 41.42
See application file for complete search history.

(56) References Cited

U.S. PATENT DOCUMENTS

| 5,537,956 A | * | 7/1996 | Rennfeld et al. | ......... 123/41.29 |
| 5,647,534 A | * | 7/1997 | Kelz et al. | ............... 237/12.3 B |
| 6,450,275 B1 | * | 9/2002 | Gabriel et al. | ........... 180/65.23 |

(Continued)

FOREIGN PATENT DOCUMENTS

JP A-04-275492 10/1992

(Continued)

OTHER PUBLICATIONS

Oct. 20, 2009 Office Action issued in Japanese Patent Application No. 2006-072834 with English translation.

*Primary Examiner*—Frank B Vanaman
*Assistant Examiner*—Erez Gurari
(74) *Attorney, Agent, or Firm*—Oliff & Berridge, PLC (57) ABSTRACT

An electric motor radiator (34), a feeding mechanism (30), and a cooling oil circulation path (32) constitute a cooling mechanism that cools the electric motor (6) via an electric motor cooling oil that is a cooling medium. The electric motor radiator (34) forms a circulation path between the electric motor (6), and cooling of the electric motor (6) is performed via the electric motor cooling oil. A PCU radiator (44), a feeding mechanism (40) and a cooling water circulation path (42) constitute a cooling mechanism that cools a PCU (8) via a PCU cooling water that is a cooling medium. The PCU radiator (44) forms a circulation path between the PCU (8), and cooling of the PCU (8) is performed via the PCU cooling water. Further, the feeding mechanism (30, 40) operate by power received from a power storage portion (16).

5 Claims, 6 Drawing Sheets

U.S. PATENT DOCUMENTS

| | | |
|---|---|---|
| 6,487,998 B1 | 12/2002 | Masberg et al. |
| 7,377,237 B2 * | 5/2008 | Carney et al. ............ 123/41.31 |
| 7,649,273 B2 * | 1/2010 | Zillmer et al. ............ 290/40 C |
| 2003/0230996 A1 | 12/2003 | Gabriel et al. |
| 2004/0045749 A1 * | 3/2004 | Jaura et al. ................ 180/65.2 |

FOREIGN PATENT DOCUMENTS

| | | |
|---|---|---|
| JP | A-5-310048 | 11/1993 |
| JP | A-8-130856 | 5/1996 |
| JP | A-08-196002 | 7/1996 |
| JP | A-10-238345 | 9/1998 |
| JP | A-11-511224 | 9/1999 |
| JP | A-11-285106 | 10/1999 |
| JP | A-2003-169448 | 6/2003 |
| JP | A-2004-048987 | 2/2004 |
| JP | A-2004-100956 | 4/2004 |
| JP | A-2004-112855 | 4/2004 |
| JP | A-2005-117790 | 4/2005 |

* cited by examiner

HYBRID VEHICLE

TECHNICAL FIELD

The present invention relates to a hybrid vehicle including an engine and an electric motor, and in particular, to a hybrid vehicle configured to be capable of cooling an electric motor and a power converting portion for driving the electric motor.

BACKGROUND ART

In recent years, hybrid vehicles are receiving widespread attention as environmentally friendly vehicles. As its motive power source, a hybrid vehicles further employs, in addition to a conventional engine, a power storage portion such as a rechargeable battery and an electric motor that operates by electric power from the power storage portion.

In a hybrid vehicle, the combustion efficiency is improved by optimally controlling torque and rotation speed of the electric motor. In order to realize such control of the electric motor, the hybrid vehicle includes a power converting portion such as an inverter. The power converting portion receives direct current (DC) power from the power storage portion, and converts it into alternating current (AC) power having prescribed voltage, frequency, phase and the like and supplies the result to the electric motor.

Heat is generated in the electric motor by copper loss attributed to resistance of the coil, or iron loss attributed to AC magnetic flux passing the core. Also, heat is generated in the power converting portion by switching loss in the switching elements such as IGBTs (Insulated Gate Bipolar Transistors). Here, the heat generation in the electric motor is chiefly attributed to copper loss, which increases along with the output of the electric motor. On the other hand, switching loss in the power converting portion is substantially constant irrespective of the electric power, provided that the switching frequency is the same. That is, while the heat generation amount in the electric motor changes in accordance with the generated vehicle drive force, the heat generation amount in the power converting portion hardly changes.

Thus, in the hybrid vehicle, it is necessary to cool the electric motor and the power converting portion, in addition to the engine. Then, for example, Japanese Patent Laying-Open No. 2004-112855 discloses a series-type hybrid vehicle that dispenses with an electric motor for driving a refrigerant press-feeding pump, so that the costs can be reduced and the weight of the vehicle is suppressed. The hybrid vehicle includes: a power generator coupled to the output shaft of an engine; a first refrigerant press-feeding pump coupled to the shaft of the power generator to pressurize and feed a refrigerant; and a second refrigerant press-feeding pump coupled to the shaft of the power generator to pressurize and feed a refrigerant. The refrigerant having been pressurized and fed by the first refrigerant press-feeding pump cools the electric motor, and the refrigerant having been pressurized and fed by the second refrigerant press-feeding pump cools an inverter.

It is to be noted that the series-type hybrid vehicle is a vehicle in which the electric motor powered by the power generator coupled to the output shaft of the engine solely generates the vehicle drive force, while the engine does not directly generate the vehicle drive force.

The configuration disclosed in Japanese Patent Laying-Open No. 2004-112855 is predicated on a series-type hybrid vehicle, i.e., predicated on the condition that the engine and the power generator always operate while the vehicle is traveling. However, many hybrid vehicles in practical use employ the parallel type configured to be capable of generating the vehicle drive force from any of the engine and the electric motor, or the parallel/series type in which elements of the series type is added to the configuration of the parallel type, in order to realize higher combustion efficiency (mileage). In such a parallel-type or parallel/series-type hybrid vehicle, the engine intermittently stops in accordance with a traveling situation. Accordingly, it has not been possible to apply the configuration disclosed in Japanese Patent Laying-Open No. 2004-112855 to parallel-type and parallel/series-type hybrid vehicles.

DISCLOSURE OF THE INVENTION

The present invention has been made to solve such a problem, and an object thereof is to provide a hybrid vehicle including an engine and an electric motor each configured to be capable of generating vehicle drive force, which can stably cool the electric motor and a power converting portion.

A hybrid vehicle according to the present invention includes: an engine and an electric motor each configured to be capable of generating vehicle drive force; a power storage portion configured to be capable of being charged and discharged; a power converting portion converting power received from the power storage portion for driving the electric motor; a first cooling mechanism cooling the electric motor via a first cooling medium; and a second cooling mechanism cooling the power converting portion via a second cooling medium. The first cooling mechanism includes: a first heat exchanging portion cooling the first cooling medium by performing heat exchange; and a first feeding mechanism for allowing the first cooling medium to circulate through a first circulation path formed to include the electric motor and the first heat exchanging portion. The second cooling mechanism includes: a second heat exchanging portion cooling the second cooling medium by performing heat exchange; and a second feeding mechanism allowing the second cooling medium to flow through a second circulation path formed to include the power converting portion and the second heat exchanging portion. The engine stops intermittently in accordance with a traveling situation. The first and second feeding mechanisms are configured to be operable even when the engine is stopped.

The hybrid vehicle according to the present invention includes the first cooling mechanism cooling the electric motor and the second cooling mechanism cooling the power converting portion. The first and second cooling mechanisms respectively include the first and second feeding mechanisms configured to be operable even when the engine is stopped. Thus, even when the engine is stopped, the first and second cooling media are allowed to circulate and the cooling capacity can be attained.

Further, the hybrid vehicle according to the present invention includes the first and second heat exchanging portions respectively corresponding to the electric motor and the power converting portion having cooling request different from each other's. Thus, it is possible to efficiently design the cooling capacity (for example, size) of the first and second heat exchanging portions so as to satisfy the cooling request of the electric motor and that of the power converting portion.

Accordingly, the electric motor and the power converting portion can stably be cooled in the hybrid vehicle in which the engine intermittently stops in accordance with a traveling situation.

Preferably, the first and second feeding mechanisms electrically operate.

Preferably, the first cooling mechanism is configured to include a path that attains cooling by bringing the first cooling medium into direct contact with a coil constituting the electric motor.

Preferably, the second cooling mechanism further includes a bypass path having its opposing ends connected to the second circulation path and formed to be capable of allowing the second cooling medium to circulate through a path that includes the power converting portion and that does not include the second heat exchanging portion, a path switching portion configured to be capable of performing switching so that the second cooling medium output from the power converting portion flows through one of the second heat exchanging portion and the bypass path, and a control portion controlling the path switching portion based on a temperature of the second cooling medium.

Preferably, the control portion controls the path switching portion to allow circulation of the second cooling medium through a path that includes the power converting portion and the second heat exchanging portion when the temperature of the second cooling medium is at least a prescribed value, and controls the path switching portion to allow circulation of the second cooling medium through the path that includes the power converting portion and that does not include the second heat exchanging portion when the temperature of the second cooling medium is not at least the prescribed value.

Preferably, the first cooling medium is made of oil.

Preferably, the second cooling medium is made of water.

The present invention can implement a hybrid vehicle wherein an engine and an electric motor are each configured to be capable of generating vehicle drive force, which can stably cool the electric motor and a power converting portion.

BEST MODES FOR CARRYING OUT THE INVENTION

In the following, an embodiment of the present invention is described in detail referring to the drawings. In the drawings, the same or corresponding portions are denoted by the same character, and description thereof will not be repeated.

Figure 1:
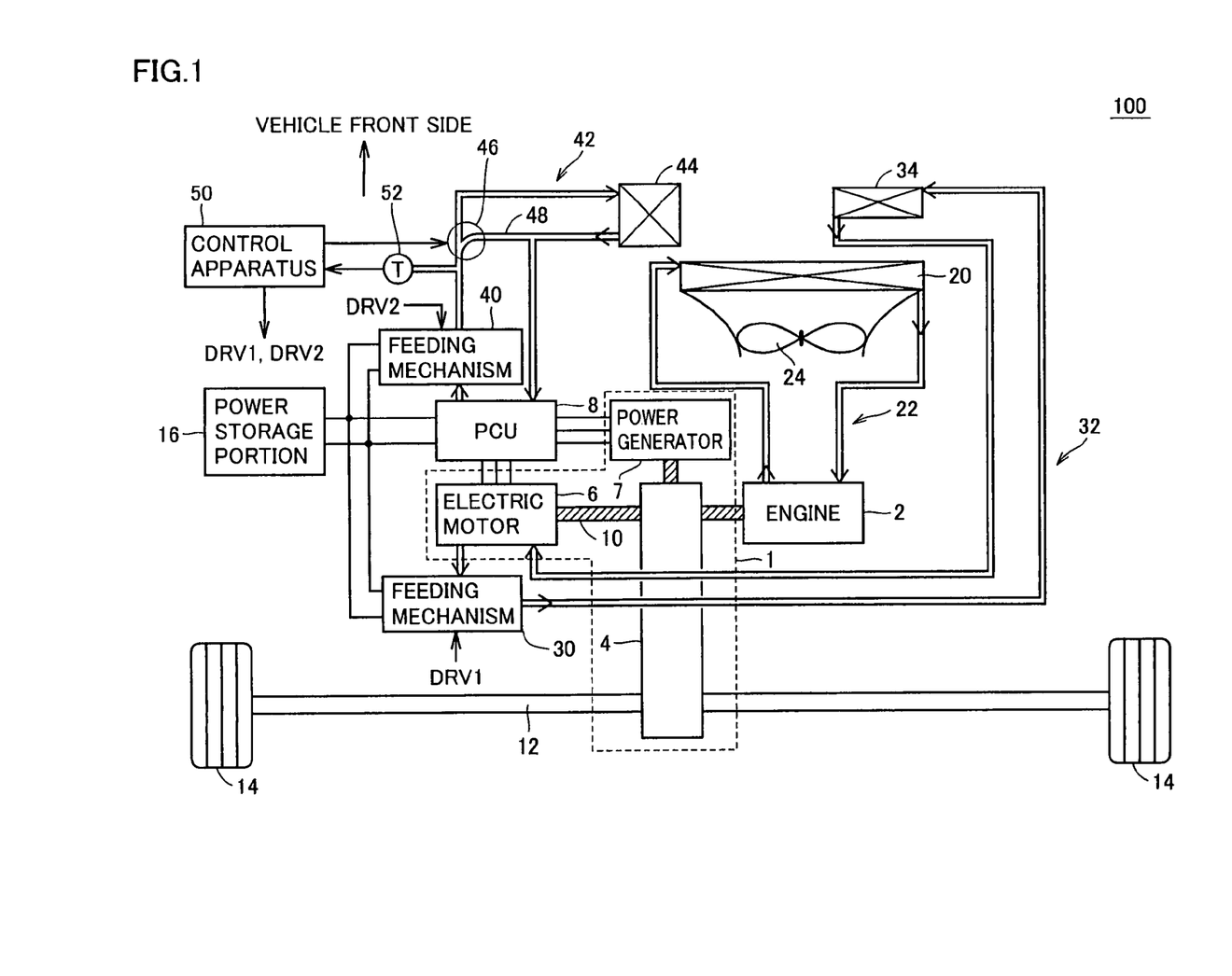
FIG. 1 is a schematic configuration diagram of a hybrid vehicle according to an embodiment of the present invention.

Referring to FIG. 1, a hybrid vehicle 100 includes an engine 2, a power storage portion 16, a transaxle 1, and a PCU (Power Control Unit) 8.

Engine 2 utilizes thermal energy from the combustion of fuel such as gasoline to rotate a drive shaft 10, so that drive force is generated in driving wheels 14.

Power storage portion 16 is electrically connected to PCU 8 and configured to be capable of being charged and discharged. For example, it is formed with a rechargeable battery such as a nickel-hydride battery or a lithium ion battery, or a capacitor with a large capacitance such as an electric double layer capacitor. Power storage portion 16 can receive DC power supplied from PCU 8 and stores the electric energy. Power storage portion 16 can also supply the stored electric energy to PCU 8 as DC power.

Transaxle 1 is formed by integrally structured transmission and axle, and has an electric motor 6, a power generator 7, and a powertrain 4. Transaxle 1 is configured to be capable of receiving rotary drive force from engine 2 and electric motor 6 mechanically coupled via common drive shaft 10 and to transmit it to wheel shaft 12. That is, transaxle 1 receives the rotary drive force from at least one of engine 2 and electric motor 6 and generates the vehicle drive force at driving wheels 14 via wheel shaft 12.

Electric motor 6 is electrically connected to PCU 8 and generates rotary drive force of prescribed torque in accordance with AC power received from PCU 8. Electric motor 6 is configured to be capable of transmitting the generated rotary drive force, together with the rotary drive force from engine 2, via drive shaft 10 to powertrain 4. In the regenerative braking mode of hybrid vehicle 100, electric motor 6 generates electric energy (AC power) from kinetic energy provided via driving wheels 14, and supplies the generated AC power to PCU 8. Power generator 7 receives part of the rotary drive force at drive shaft 10 and generates AC power, and supplies the AC power to PCU 8. For example, electric motor 6 and power generator 7 are synchronous motors that rotate synchronizing with three-phase AC power, and particularly made of a permanent magnet type synchronous motor having a rotor to which a permanent magnet is embedded.

Powertrain 4 is arranged between drive shaft 10 and wheel shaft 12 to transmit the rotary drive force input via drive shaft 10 to wheel shaft 12, and also to transmit part of that rotary drive force to power generator 7. Specifically, powertrain 4 includes a power split mechanism that also functions as a shift mechanism such as a planetary gear, and it changes the ratio of an output rotation speed of wheel shaft 12 to an input rotation speed from drive shaft 10 (gear ratio), in accordance with a shift command from a not-shown external ECU (Electrical Control Unit) or the like.

In accordance with a torque command, rotation speed command and the like from the not-shown external ECU and the like, PCU 8 converts DC power supplied from power storage portion 16 into AC power having prescribed voltage, frequency and phase, and supplies the result to electric motor 6 of transaxle 1. Also, in regenerative braking, it converts AC power generated by electric motor 6 and charges power storage portion 16. Furthermore, PCU 8 receives AC power supplied from power generator 7 and supplies it to at least one of electric motor 6 and power storage portion 16. PCU 8 is constituted of a three-phase bridge circuit or the like that includes switching elements such as IGBTs (Insulated Gate Bipolar Transistors), power MOSFETs (Metal Oxide Semiconductor Field-Effect Transistors) and the like.

In hybrid vehicle 100 described above, engine 2 is intermittently stopped in accordance with a traveling situation. Specifically, in accordance with a press-down amount of the accelerator pedal, a press-down amount of the brake pedal, a selected position of the shift lever and the like as operated by the driver, a not-shown ECU determines the vehicle drive force required of engine 2 and electric motor 6, and stops engine 2 when the required amount of vehicle drive force to engine 2 is zero. When the vehicle speed becomes equal to or greater than a prescribed value, or when rapid acceleration is requested, the ECU starts engine 2 so that the vehicle drive force is generated by engine 2.

Hybrid vehicle 100 further includes an engine radiator 20, a radiator fan 24, a cooling water circulation path 22, an electric motor radiator 34, a cooling oil circulation path 32, a feeding mechanism 30, a PCU radiator 44, a cooling water circulation path 42, a bypass path 48, a switch valve 36, a feeding mechanism 40, a temperature detection portion 52, and a control apparatus 50.

Engine radiator 20 is a heat exchanging portion arranged on the front side of hybrid vehicle 100, and forms a circulation path between engine 2 via cooling water circulation path 22. Through the circulation path, an engine cooling water containing alcohol (such as ethylene glycol), rust-inhibitor and the like circulates. Engine radiator 20 receives the air flow that is generated as the vehicle travels, and performs heat exchange between the engine cooling water flowing inside and the atmosphere, thereby cooling (dissipating heat from) the engine cooling water. That is, the engine cooling water absorbs heat from engine 2 (cools engine 2), and dissipates the absorbed heat from engine radiator 20. Through such processes, engine 2 is cooled.

Radiator fan 24 is arranged, for example, on the rear side of the vehicle relative to engine radiator 20, and generates air flow toward engine radiator 20 from the rear side of the vehicle, thereby improving the heat exchange efficiency in engine radiator 20.

Electric motor radiator 34, feeding mechanism 30 and cooling oil circulation path 32 constitute a cooling mechanism for cooling electric motor 6 via an electric motor cooling oil that is a cooling medium.

Electric motor radiator 34 is a heat exchanging portion arranged, for example, on the further front side of the vehicle relative to engine radiator 20. Electric motor radiator 34 forms a circulation path between electric motor 6 via cooling oil circulation path 32. Through the circulation path, an electric motor cooling oil circulates. Electric motor radiator 34 receives the air flow that is generated as the vehicle travels, and performs heat exchange between the electric motor cooling oil flowing inside and the atmosphere, thereby cooling (dissipating heat from) the electric motor cooling oil. That is, the electric motor cooling oil absorbs heat from electric motor 6 (cools electric motor 6) and dissipates the absorbed heat from electric motor radiator 34. Feeding mechanism 30 is interposed in cooling oil circulation path 32. It receives at its one end the electric motor cooling oil and applies pressure thereto, and feeds the result from the other end, so that the electric motor cooling oil flows through cooling oil circulation path 32. The detail of the configuration of feeding mechanism 30 will be described later.

On the other hand, PCU radiator 44, feeding mechanism 40 and cooling water circulation path 42 constitute a cooling mechanism for cooling PCU 8 via a PCU cooling water that is a cooling medium.

PCU radiator 44 is a heat exchanging portion arranged, for example, on the further front side of the vehicle relative to engine radiator 20. PCU radiator 44 forms a circulation path between PCU 8 via cooling water circulation path 42. Through the circulation path, a PCU cooling water containing alcohol (ethylene glycol), rust-inhibitor and the like, similarly to the above-described engine cooling water, circulates. PCU radiator 44 receives the air flow that is generated as the vehicle travels, and performs heat exchange between the PCU cooling water flowing inside and the atmosphere, thereby cooling (dissipating heat from) the PCU cooling water. That is, the PCU cooling water absorbs heat from PCU 8 (cools PCU 8) and dissipates the absorbed heat from PCU radiator 44. Feeding mechanism 40 is interposed in cooling water circulation path 42. It receives at its one end the PCU cooling water and applies pressure thereto, and feeds the result from the other end, so that the PCU cooling water flows through PCU cooling water circulation path 42. The detail of the configuration of feeding mechanism 40 will be described later.

The cooling mechanism for PCU 8 further includes a bypass path 48, a switch valve 46, a temperature detection portion 52, and a control apparatus 50.

Bypass path 48 has its opposing ends connected to cooling water circulation path 42, and allows the PCU cooling water to circulate the path including PCU 8 and not including PCU radiator 44. Switch valve 46 is interposed at a connection portion between cooling water circulation path 42 and bypass path 48. In accordance with a control command from control apparatus 50, switch valve 46 switches the path so that the PCU cooling water output from PCU 8 flows through one of PCU radiator 44 and bypass path 48. That is, when switch valve 46 selects the path to PCU radiator 44, the PCU cooling water output from PCU 8 is fed by feeding mechanism 40, and cooled by PCU radiator 44. On the other hand, when switch valve 46 selects the path of bypass path 48, the PCU cooling water output from PCU 8 circulates through the path including PCU 8 and bypass path 48, and therefore is not cooled.

Temperature detection portion 52 is arranged between feeding mechanism 40 and switch valve 46, and detects the temperature of the PCU cooling water passing through that portion, and outputs the detection result to control apparatus 50. In order to efficiently cool PCU 8, control apparatus 50 provides a control command to switch valve 46 based on the detection result from temperature detection portion 52, in accordance with a control structure, which will be described later. For example, control apparatus 50 is configured with an ECU.

Figure 2:
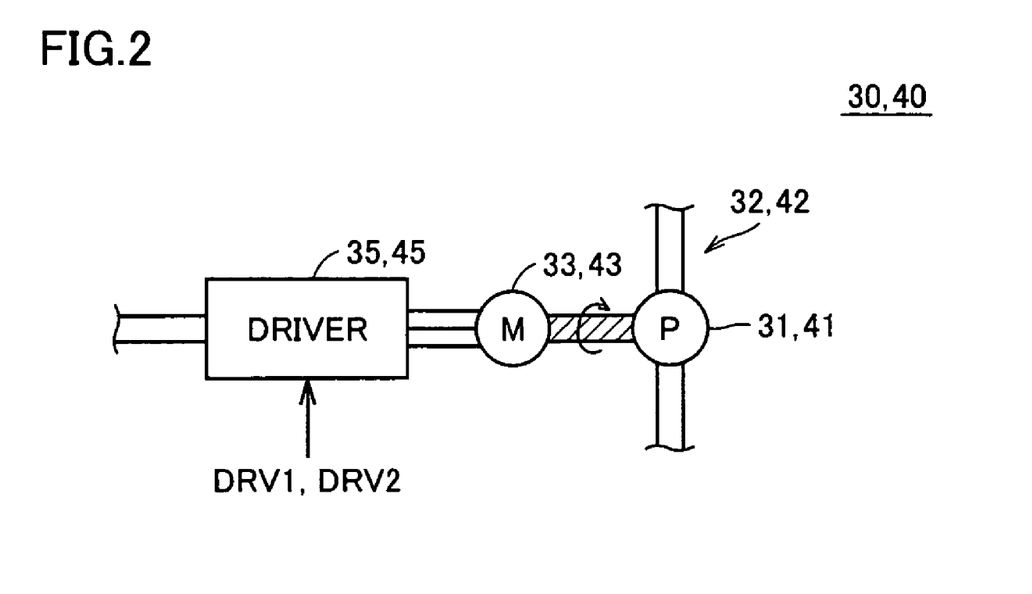
FIG. 2 is a more detailed schematic configuration diagram showing a feeding mechanism.

Referring to FIG. 2, feeding mechanism 30 is constituted of a feeding pump 31, a pump drive electric motor 33, and a driver 35.

Feeding pump 31 is mechanically coupled to pump drive electric motor 33. By the rotary drive force from pump drive electric motor 33, feeding pump 31 applies pressure to the electric motor cooling oil received from one port and feeds it from the other port. For example, feeding pump 31 generates pressure as an impeller, a vane and the like are rotated by pump drive electric motor 33.

Pump drive electric motor 33 rotates by receiving the power supplied from driver 35 in accordance with a command DRV1 from control apparatus 50. For example, pump drive electric motor 33 is a DC sensorless brushless motor.

Driver 35 converts the DC power received from power storage portion 16 (FIG. 1) into a prescribed voltage and supplies the result to pump drive electric motor 33.

Feeding mechanism 40 is implemented by substantially the same configuration as feeding mechanism 30. Feeding mechanism 40 is provided with a feeding pump 41, a pump drive electric motor 43 and a driver 45 instead of feeding pump 31, pump drive electric motor 33 and driver 35 respectively in the configuration of feeding mechanism 30, wherein a command DRV2 is used instead of command DRV1. Therefore, detailed description is not repeated.

As described above, in hybrid vehicle 100 according to the embodiment of the present invention, the cooling mechanism for electric motor 6 (electric motor radiator 34, feeding mechanism 30, and cooling oil circulation path 32) and the cooling mechanism for PCU 8 (PCU radiator 44, feeding mechanism 40 and cooling water circulation path 42) are configured independently from each other. Therefore, according to hybrid vehicle 100, both the cooling request to electric motor 6, that increasingly generates heat as the generated vehicle drive force (the consumed electric power) becomes greater, and the cooling request to PCU 8 that substantially constantly generates heat irrespective of the electric power supplied to electric motor 6, can be satisfied efficiently.

In contrast, in the conventional configuration where electric motor 6 and PCU 8 are cooled by the same cooling mechanism, it is necessary to determine the cooling capacity so that electric motor 6, of which heat generation amount varies in accordance with the traveling situation, is sufficiently cooled. Often, the cooling capacity determined in this manner is equal to or greater than the capacity necessary for PCU 8 having substantially the constant heat generation amount. That is, since the cooling request requested by electric motor 6 and that requested by PCU 8 do not agree with each other, it has been necessary to adapt the cooling request to the cooling request of electric motor 6 thereby attaining the undue cooling capacity. As a result, there has been a problem that the radiators, the feeding mechanisms and the circulation paths are great in size.

With hybrid vehicle 100 according to the embodiment of the present invention, since the cooling mechanism for electric motor 6 and that for PCU 8 are independently configured, the cooling capacity can appropriately be designed according to respective heat generation amounts, and the size of the radiators, feeding mechanisms and circulation paths and the like can be set to achieve improved efficiency.

In the following, the characteristic configurations in the cooling mechanism for electric motor 6 and that for PCU 8 will be described in detail.

Cooling for Electric Motor 6

Figure 3:
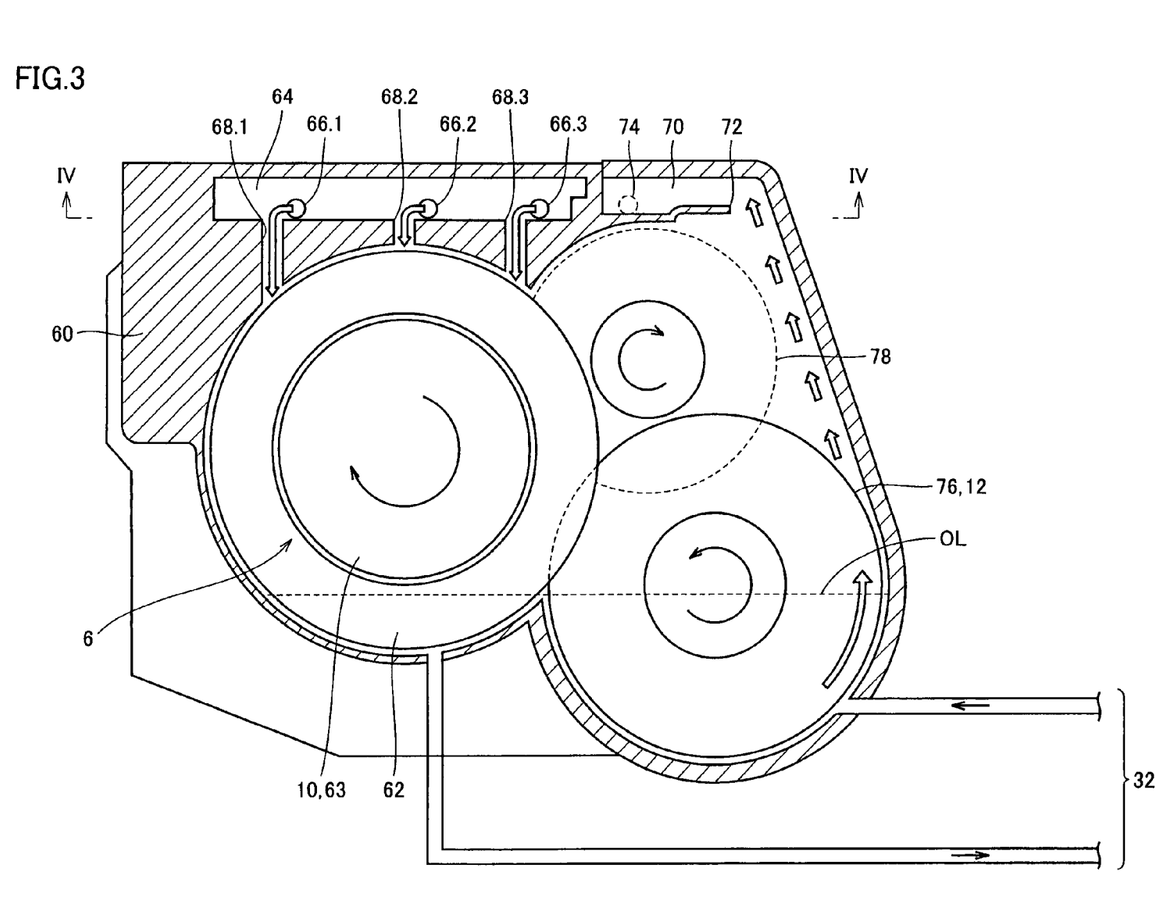
FIG. 3 is a partial cross-sectional view showing a path of an electric motor cooling oil, which is part of a cooling mechanism for an electric motor.

Referring to FIG. 3, a partial cross-sectional view of a storage chamber storing electric motor 6 and respective cases storing a reduction gear and wheel shaft 12 is shown.

Figure 4:
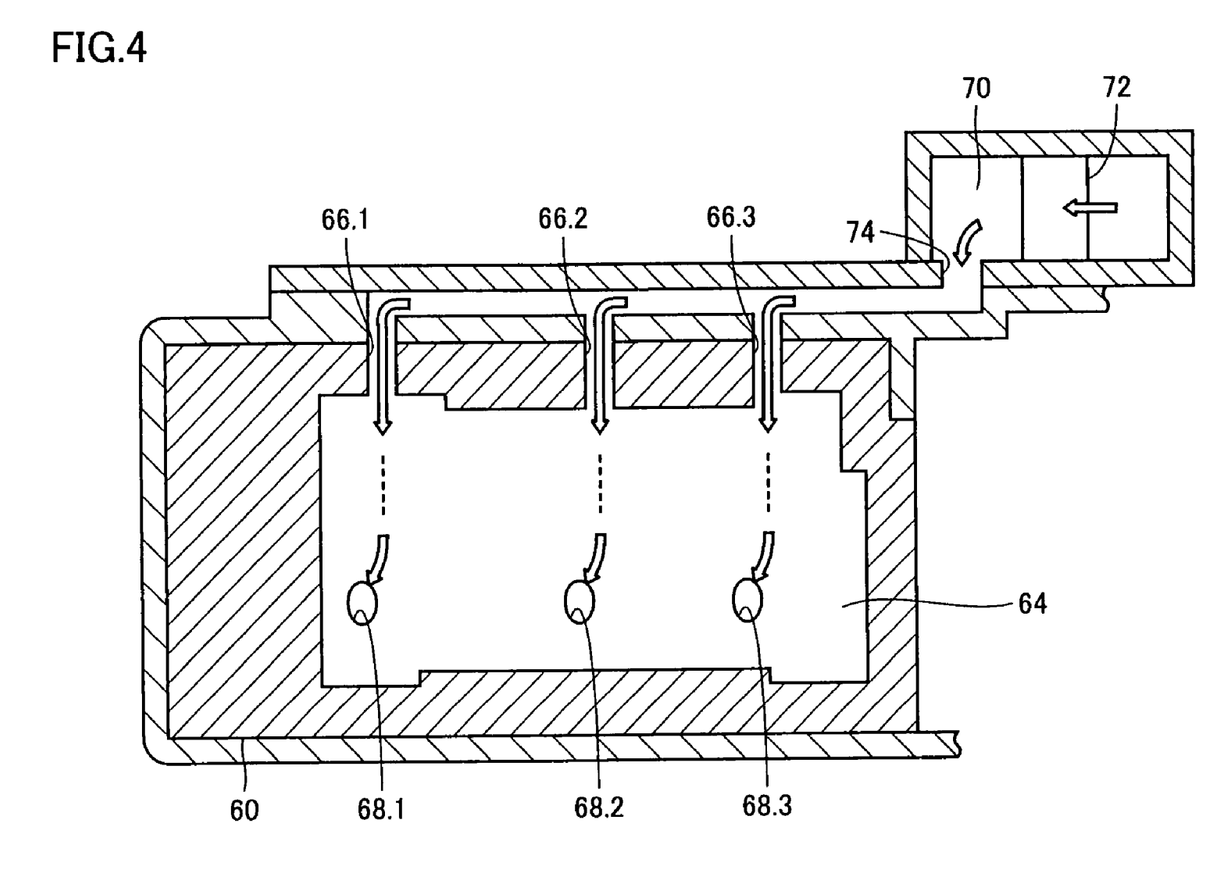
FIG. 4 is a partial cross-sectional view along line IV-IV in FIG. 3.

Referring to FIGS. 3 and 4, electric motor 6 is arranged in the storage chamber formed by a division wall 60. In the upper portion of division wall 60, a passage 64 of the electric motor cooling oil is provided. Passage 64 communicates with an oil reservoir 70 and the storage chamber of electric motor 6.

The electric motor cooling oil is stored by oil level OL. Accordingly, the bottom portion of the storage chamber functions as an oil pan. In accordance with the rotation of rotor 63 of electric motor 6 mechanically coupled to drive shaft 10 and the like, a counter driven gear 78 is rotated. In accordance with the rotation of counter driven gear 78, a differential gear 76 mechanically coupled to wheel shaft 12 rotates. Then, as indicated by the arrows in FIG. 3, differential gear 76 splashes the electric motor cooling oil upwardly. In the upper portion of the case, an oil catch plate 72 is provided. The electric motor cooling oil being splashed by differential gear 76 is accumulated in oil reservoir 70 through oil catch plate 72. In oil reservoir 70, an oil outlet 74 is provided. As shown in FIG. 4, oil outlet 74 communicates with oil inlets 66.1, 66.2, and 66.3.

The electric motor cooling oil reaching passage 64 passes through oil outlets 68.1, 68.2, and 68.3 provided at division wall 60, and it is poured onto the upper portion of stator coil 62. The electric motor cooling oil poured onto the upper portion of stator coil 62 flows over the outer circumference of stator coil 62 while performing heat exchange with stator coil 62, and returns to the bottom portion of the storage chamber. That is, the electric motor cooling oil directly contacts stator coil 62 and cools stator coil 62.

Furthermore, at the bottom portion of the storage chamber, two openings for communication with cooling oil circulation path 32 are provided, through which part of the stored electric motor cooling oil is circulated between electric motor radiator 34, and electric motor 6 is cooled. For example, from the opening positioned immediately below electric motor 6, the electric motor cooling oil of relatively high temperature, having absorbed the heat of electric motor 6, is extracted. The electric motor cooling oil after being cooled by electric motor radiator 34 is returned to the portion near the bottom portion of differential gear 76.

As described above, since the electric motor cooling oil is poured onto stator coil 62 from above electric motor 6 to be in direct contact, stator coil 62 being the source of heat generation of electric motor 6 can efficiently be cooled. Therefore, even when the vehicle drive force generated by electric motor 6 is great and the heat generation amount is great, electric motor 6 can be cooled stably.

Cooling for PCU 8

Referring to FIG. 1 again, the cooling mechanism for electric motor 6 and that for PCU 8 are configured independently from each other, and therefore reduction in size of PCU radiator 44 and the like can be achieved. On the other hand, reduction in size of PCU radiator 44 increases the flow resistance. As a result, the power consumption in feeding mechanism 40 can relatively be increased. Accordingly, control apparatus 50 suppresses power consumption in feeding mechanism 40 by shortening the time during which PCU cooling water circulates between PCU 8 and PCU radiator 44. Specifically, if the temperature of the PCU cooling water output from PCU 8 is not smaller than a prescribed value, control apparatus 50 provides a control command to switch valve 46 so that the PCU cooling water is led to PCU radiator 44 and cooling is performed. On the other hand, if the temperature of the PCU cooling water output from PCU 8 is smaller than a prescribed value, control apparatus 50 provides a control command to switch valve 46 so that the PCU cooling water circulates between PCU 8 and bypass path 48.

FIG. 5(a), shows a case where the temperature of the PCU cooling water is not smaller than a prescribed value.

FIG. 5(b), shows a case where the temperature of the PCU cooling water is smaller than a prescribed value.

Referring to FIG. 5(a), when the temperature of the PCU cooling water is not smaller than a prescribed value, control apparatus 50 provides a control command so that switch valve 46 selects the PCU radiator 44 side. Then, the PCU cooling water circulates between PCU 8 and PCU radiator 44. Therefore, the PCU cooling water having absorbed the heat of PCU 8 (cooled PCU 8) is cooled by heat exchange at PCU radiator 44.

On the other hand, referring to FIG. 5(b), when the temperature of the PCU cooling water is smaller than a prescribed value, control apparatus 50 provides a control command such that switch valve 46 selects bypass path 48. Then, the PCU cooling water circulates between PCU 8 and bypass path 48. Therefore, the PCU cooling water having absorbed the heat of PCU 8 (cooled PCU 8) is not cooled and again absorbs the heat of PCU 8. Accordingly, by repeatedly circulating between PCU 8 and bypass path 48, the temperature of the PCU cooling water gradually increases.

Figure 5:
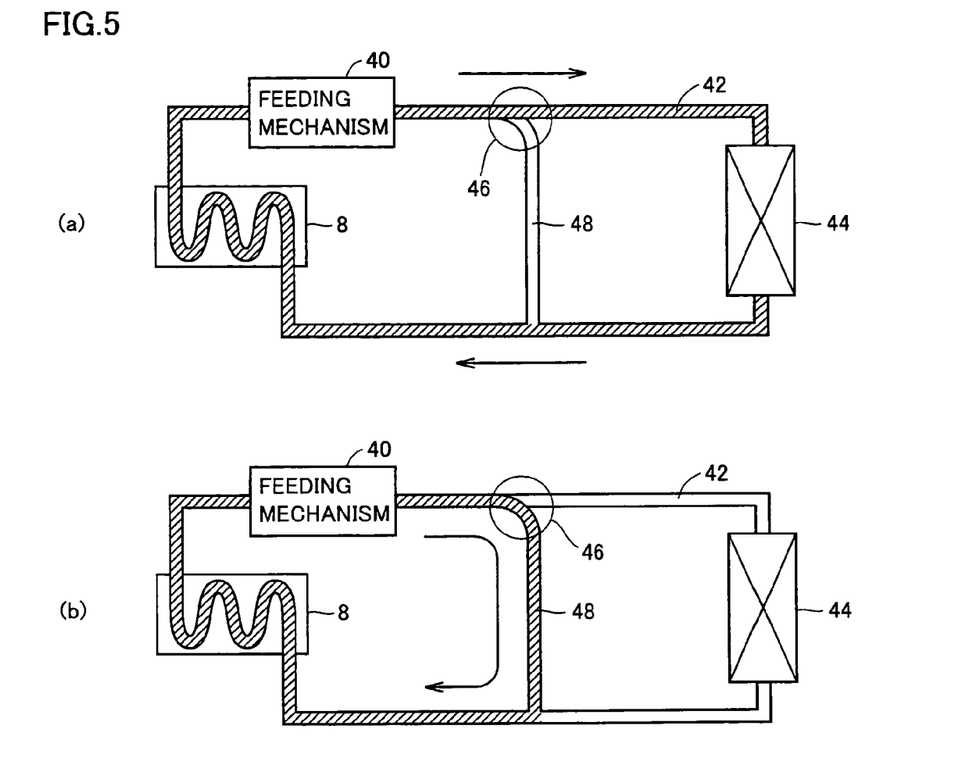
FIG. 5 is a schematic diagram showing a path of a PCU cooling water in a cooling mechanism for a PCU.

As described above, control apparatus 50 allows the PCU cooling water to pass through PCU radiator 44 only when the temperature of the PCU cooling water is not smaller than a prescribed value, while in the other period allowing the PCU cooling water to circulate between PCU 8 so that the PCU cooling water does not flow through PCU radiator 44. Thus, it suppresses the power consumption in feeding mechanism 40 (pump drive electric motor 33).

In the following, the control structure of a program executed by control apparatus 50 is described.

Figure 6:
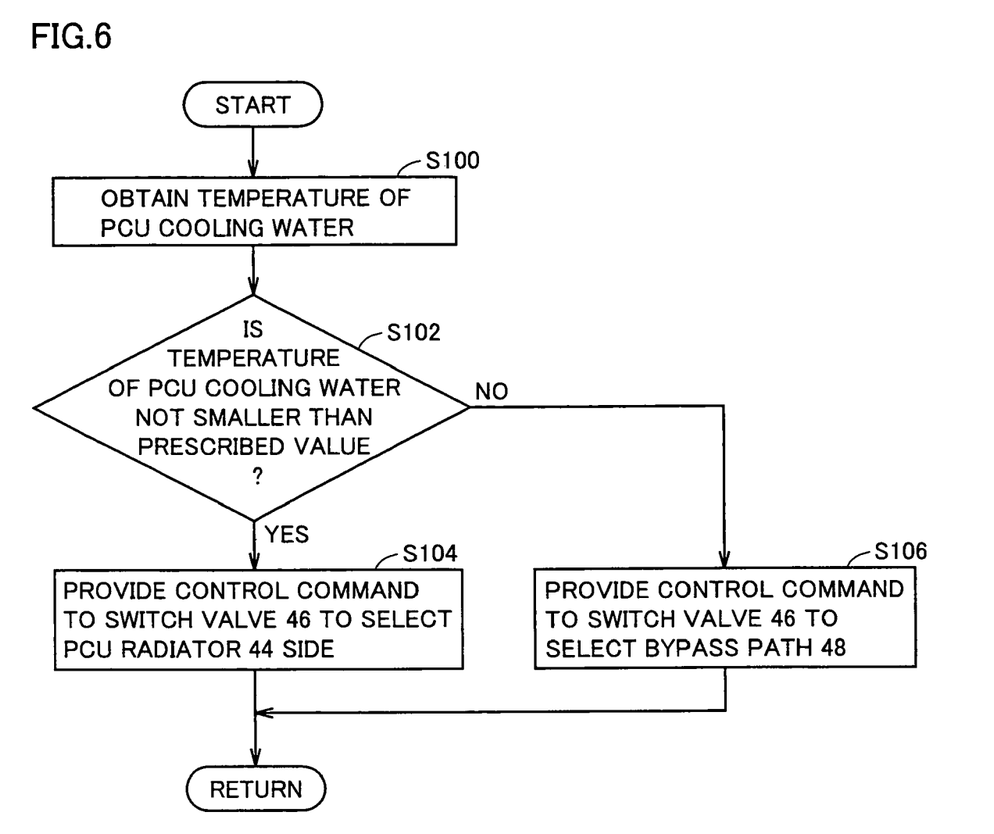
FIG. 6 is a flowchart showing a control structure of a program executed by a control apparatus.

Control apparatus 50 repeatedly performs the flowchart of FIG. 6 at a prescribed cycle (for example, 100 msec).

Referring to FIG. 6, control apparatus 50 obtains a temperature of the PCU cooling water from temperature detection portion 52 (step S100). Control apparatus 50 determines whether the temperature of the PCU cooling water is not smaller than a prescribed value (step S102).

When the temperature of the PCU cooling water is not smaller than a prescribed value (YES in step S102), control apparatus 50 provides a control command to switch valve 46 to select the PCU radiator 44 side (step S104).

When the temperature of the PCU cooling water is smaller than a prescribed value (NO in step S102), control apparatus 50 provides a control command to switch valve 46 to select bypass path 48 (step S106).

Then, control apparatus 50 returns to the first process.

In the embodiment of the present invention, electric motor radiator 34, feeding mechanism 30, and cooling oil circulation path 32 correspond to "a first cooling mechanism". Cooling oil circulation path 32 corresponds to "a first circulation path". Electric motor radiator 34 corresponds to "a first heat exchange portion". Feeding mechanism 30 corresponds to "a first feeding mechanism". PCU radiator 44, feeding mechanism 40, cooling water circulation path 42, bypass path 48 and switch valve 46 correspond to "a second cooling mechanism". Cooling water circulation path 42 corresponds to "a second circulation path". PCU radiator 44 corresponds to "a second heat exchange portion". Feeding mechanism 40 corresponds to "a second feeding mechanism". Switch valve 46 corresponds to "a path switch portion". Control apparatus 50 corresponds to "a control portion".

In the embodiment of the present invention described above, it may also be possible to configure such that drive timing, speed and the like of pump drive electric motors 33 and 43 are further controlled in accordance with the conditions of the electric motor cooling oil and the PCU cooling water that are the cooling media. With such a configuration, the electric motor and the PCU can be cooled further efficiently.

In the embodiment of the present invention described above, while the configuration for cooling electric motor 6 has been detailed, it is possible to configure such that power generator 7 is cooled by the same configuration as the cooling configuration for electric motor 6.

In the embodiment of the present invention described above, while the example where the present invention is applied to a parallel/series-type hybrid vehicle has been described, it goes without saying that the present invention is also applicable to a parallel-type hybrid vehicle. That is, the present invention is also applicable to such a vehicle that further includes an electric motor for driving not-shown other wheel in FIG. 1.

According to the embodiment of the present invention, a cooling mechanism for cooling electric motor 6 and a cooling mechanism for cooling PCU 8 are provided. Respective cooling mechanisms operate (feed the cooling medium) by the power received from power storage portion 16. Thus, even when the engine is stopped, respective cooling mechanisms circulate the electric motor cooling oil and the PCU cooling water that are the cooling media, and electric motor 6 and PCU 8 can continuously be cooled. Accordingly, also in a hybrid vehicle where the engine is intermittently stopped, the electric motor and the electric power converting portion can stably be cooled.

According to the embodiment of the present invention, since the cooling mechanism that cools electric motor 6 and the cooling mechanism that cools PCU 8 are arranged independently from each other, the radiators, the feeding mechanisms, the circulation paths and the like can be designed appropriately, in accordance with respective heat generation amounts. Thus, it is not necessary to configure the radiators, the feeding mechanisms, the circulation paths and the like with increased size to attain undue cooling capacity, as in the case where electric motor 6 and PCU 8 are realized by a common cooling mechanism. Thus, as the total discharge amount of the pumps can be suppressed, the power consumption of pump drive electric motors 33 and 43 can be reduced. Also, since the heat dissipation amount from electric motor radiator 34 reduced in size is reduced, an increase in the temperature of the air flow after passing through electric motor radiator 34 is suppressed. Therefore, the ambient temperature of engine radiator 20 arranged behind it is also suppressed to be low. Thus, the heat dissipation efficiency of engine radiator 20 can be increased, and engine radiator 20 can also be further reduced in size.

According to the embodiment of the present invention, the electric motor cooling oil is poured onto the upper portion of stator coil 62 of electric motor 6, and the electric motor cooling oil flows over the outer circumference of stator coil 62 while directly contacting thereto, whereby electric motor 6 is cooled. Thus, stator coil 62 that is the heat generation source of electric motor 6 can efficiently be cooled, and therefore, even when the heat generation amount of electric motor 6 is great in a high-load drive mode such as when rapid acceleration is required or when going up a hill, electric motor 6 can stably be cooled.

According to the embodiment of the present invention, in accordance with a temperature of the PCU cooling water, a path including PCU 8 and PCU radiator 44, or a path including PCU 8 and not including PCU radiator 44 can be selected to allow the PCU cooling water to circulate. Thus, even when the flow resistance increases in association with reduction in size of PCU radiator 44 and the consumption in feeding mechanism 40 (substantially, pump drive electric motor 43) increases, the operation time during which the PCU cooling water is circulated in the path including PCU 8 and PCU radiator 44 can be suppressed. Thus, the power consumption as a whole can be suppressed. As to the period during which the PCU cooling water is circulated in the path including PCU 8 and bypass path 48, by increasing the flow velocity of the PCU cooling water that contacts PCU 8, the cooling efficiency for PCU 8 can be improved. That is, while suppressing an increase in the power consumption associated with an increase in the flow resistance, an increase in the cooling efficiency for PCU 8 can be realized at the same time.

According to the embodiment of the present invention, by using the cooling medium made of oil (the electric motor cooling oil) for cooling electric motor 6, deterioration in insulation and corrosion can be prevented. Also, it allows the cooling medium to be directly poured onto the upper portion of the stator of electric motor 6. Thus, efficient cooling of electric motor 6 can be realized. On the other hand, by using the cooling medium made of water (the PCU cooling water) for cooling PCU 8, an increase in the temperature of PCU 8 can be limited to the boiling point of the PCU cooling water.

It should be understood that the embodiment disclosed herein is illustrative and non-restrictive in every respect. The scope of the present invention is defined by the terms of the claims, rather than the description above, and is intended to include any changes within the meaning and scope equivalent to the terms of the claims.

The invention claimed is:

1. A hybrid vehicle, comprising:
an engine and an electric motor each configured to generate vehicle drive force;

a power storage portion configured to be charged and discharged;

a power converting portion that converts power received from said power storage portion for driving said electric motor;

a first cooling mechanism that cools said electric motor via a first cooling medium, the first cooling medium being oil; and a second cooling mechanism that cools said power converting portion via a second cooling medium, the second cooling medium being water, said first cooling mechanism comprising:
a first heat exchanging portion cooling said first cooling medium by performing heat exchange; and
a first feeding mechanism that circulates said first cooling medium through a first circulation path formed to include said electric motor and said first heat exchanging portion, said second cooling mechanism comprising:
a second heat exchanging portion cooling said second cooling medium by performing heat exchange;
a second feeding mechanism that circulates said second cooling medium through a second circulation path formed to include said power converting portion and said second heat exchanging portion;
a bypass path having opposing ends connected to said second circulation path and formed to allow said second cooling medium to circulate through a path that includes said power converting portion and that does not include said second heat exchanging portion;
a path switching portion configured to perform switching so that said second cooling medium output from said power converting portion flows through one of said second heat exchanging portion and said bypass path; and
a control portion controlling said path switching portion based on a temperature of said second cooling medium, said engine stopping intermittently in accordance with a traveling situation, said first and second feeding mechanisms being operable when said engine is stopped, and said control portion being configured to (1) control said path switching portion so that said second cooling medium circulates through a path which includes said power converting portion and said second heat exchanging portion at a first flow velocity, when the temperature of said second cooling medium is at or above a prescribed value, and (2) control said path switching portion and said second feeding mechanism so that said second cooling medium circulates through said bypass path at a second flow velocity that is greater than the first flow velocity, when the temperature of said second cooling medium is below the prescribed value.

2. The hybrid vehicle according to claim 1, wherein
said first and second feeding mechanisms electrically operate.

3. The hybrid vehicle according to claim 1, wherein
said first cooling mechanism is configured to include a path that attains cooling by bringing said first cooling medium into direct contact with a coil constituting said electric motor.

4. The hybrid vehicle according to claim 3, wherein a differential gear splashes the first cooling medium into a reservoir such that the first cooling medium is distributed onto the electric motor.

5. A method for cooling an engine comprising:
generating vehicle drive force with an engine and an electric motor;
charging and discharging a power storage portion;
converting power received from said power storage portion for driving said electric motor with a power converting portion;
cooling said electric motor via a first cooling medium with a first cooling mechanism, the first cooling medium being oil;
cooling said power converting portion via a second cooling medium with a second cooling mechanism, the second cooling medium being water;
cooling said first cooling medium by performing heat exchange with a first heat exchanging portion of said first cooling mechanism;
circulating said first cooling medium through a first circulation path formed to include said electric motor and said first heat exchanging portion with a first feeding mechanism of said first cooling mechanism,
cooling said second cooling medium by performing heat exchange with a second heat exchanging portion of said second cooling mechanism;
circulating said second cooling medium through a second circulation path formed to include said power converting portion and said second heat exchanging portion with a second feeding mechanism of said second cooling mechanism;
circulating said second cooling medium through a path that includes said power converting portion and that does not include said second heat exchanging portion with a bypass path of said second cooling mechanism having its opposing ends connected to said second circulation path;
switching so that said second cooling medium output from said power converting portion flows through one of said second heat exchanging portion and said bypass path with a path switching portion of said second cooling mechanism; and
controlling said path switching portion based on a temperature of said second cooling medium with a control portion of said second cooling mechanism,
intermittently stopping said engine in accordance with a traveling situation,
operating said first and second feeding mechanisms even when said engine is stopped, and
(1) controlling said path switching portion with said control portion so that said second cooling medium circulates through a path which includes said power converting portion and said second heat exchanging portion at a first flow velocity, when the temperature of said second cooling medium is at or above a prescribed value, and (2) controlling said path switching portion and said second feeding mechanism so that said second cooling medium circulates through said bypass path at a second flow velocity that is greater than the first flow velocity, when the temperature of said second cooling medium is below the prescribed value.

* * * * *